(12) United States Patent
Rastl et al.

(10) Patent No.: US 11,532,444 B2
(45) Date of Patent: Dec. 20, 2022

(54) CONTACT UNIT FOR SUPPLYING VEHICLES WITH POWER AND RELATED METHOD

(71) Applicant: SCHUNK CARBON TECHNOLOGY GMBH, Bad Goisern OT (AT)

(72) Inventors: Hans Rastl, Bad Goisern (AT);
Siegfried Gadocha, St. Wolfgang (AT);
Herbert Wallmann, Bad Goisern (AT);
Robert Aigner, Bad Ischl (AT)

(73) Assignee: SCHUNK CARBON TECHNOLOGY GMBH, Bad Goisern (AT)

( * ) Notice: Subject to any disclaimer, the term of this patent is extended or adjusted under 35 U.S.C. 154(b) by 985 days.

(21) Appl. No.: 16/223,199

(22) Filed: Dec. 18, 2018

(65) Prior Publication Data
US 2019/0189369 A1    Jun. 20, 2019

(30) Foreign Application Priority Data
Dec. 20, 2017 (DE) ...................... 10 2017 223 401.6

(51) Int. Cl.
| | |
|---|---|
| *H01R 13/53* | (2006.01) |
| *H01H 9/44* | (2006.01) |
| *H01R 41/00* | (2006.01) |
| *B60L 5/20* | (2006.01) |
| *B60L 5/08* | (2006.01) |

(52) U.S. Cl.
CPC ............. *H01H 9/446* (2013.01); *B60L 5/08* (2013.01); *B60L 5/205* (2013.01); *H01H 9/443* (2013.01); *H01R 13/53* (2013.01); *H01R 41/00* (2013.01); *H01H 2231/026* (2013.01); *H01R 2201/26* (2013.01)

(58) Field of Classification Search
CPC .. H01H 9/446; H01H 9/443; H01H 2231/026; B60L 5/08; B60L 5/205; H01R 13/52; H01R 41/00; H01R 2201/26
See application file for complete search history.

(56) References Cited

U.S. PATENT DOCUMENTS

| | | | |
|---|---|---|---|
| 5,041,702 A | 8/1991 | Azetsu | |
| 9,552,944 B2 * | 1/2017 | Baujan | ................. H01H 33/182 |
| 2014/0202816 A1 | 7/2014 | Kuo et al. | |

FOREIGN PATENT DOCUMENTS

| | | | | |
|---|---|---|---|---|
| CN | 101312098 A | * | 11/2008 | ............. H01H 9/346 |
| CN | 102737795 A | | 10/2012 | |
| CN | 103066555 A | | 4/2013 | |

(Continued)

OTHER PUBLICATIONS

English Translation Abstract of EP2998148A1 dated Mar. 23, 2016.
(Continued)

*Primary Examiner* — Tho D Ta
(74) *Attorney, Agent, or Firm* — Dickinson Wright PLLC; Andrew D. Dorisio

(57) ABSTRACT

The invention relates to a contact unit and to a method for steering electric arcs on a contact unit, in particular for supplying vehicles with power via an overhead wire (20), the contact unit comprising a sliding contact device (19), the sliding contact device having a contact strip support (21) and a contact strip (22) disposed thereon, the contact unit having a steering device (24) for electric arcs (25) which is disposed on the contact unit, the steering device being provided with a magnet (30).

16 Claims, 4 Drawing Sheets

(56) References Cited

FOREIGN PATENT DOCUMENTS

| | | | | |
|---|---|---|---|---|
| CN | 105291852 A | 2/2016 | | |
| DE | 2002307 A1 | 7/1971 | | |
| DE | 2130199 A1 | 1/1973 | | |
| DE | 102004035951 A1 * | 3/2006 | ............... | H01H 9/44 |
| DE | 102017217638 A1 * | 4/2019 | ............... | B60L 5/20 |
| EP | 2746091 A2 | 6/2014 | | |
| EP | 2998148 A1 | 3/2016 | | |
| GB | 560769 A | 4/1944 | | |
| JP | S53126608 A | 11/1978 | | |
| JP | H08205308 A | 8/1996 | | |
| JP | H0942850 A | 2/1997 | | |
| SU | 988597 A1 | 1/1983 | | |
| WO | WO-2013014281 A1 * | 1/2013 | ............... | H01H 1/20 |

OTHER PUBLICATIONS

English Translation of SU988597A1 dated Jan. 15, 1983.
English Translation of JPS53126608A dated Nov. 6, 1978.
English Translation Abstract of JPH08205308A dated Aug. 9, 1996.
English Translation Abstract of JPH0942850A dated Feb. 14, 1997.
Hyun-Kil Cho et al.; "DC arc extinction using external magnetic field in switching device", Electrical Machines and Systems; Nov. 9, 2003; New Jersey, US.
Sawa Koichiro et al., "Fundamental characteristics of arc extinction by magnetic blow-out at DC voltages"; Oct. 11, 2015; Nippon Electric Control Equipment Industries Association.

* cited by examiner

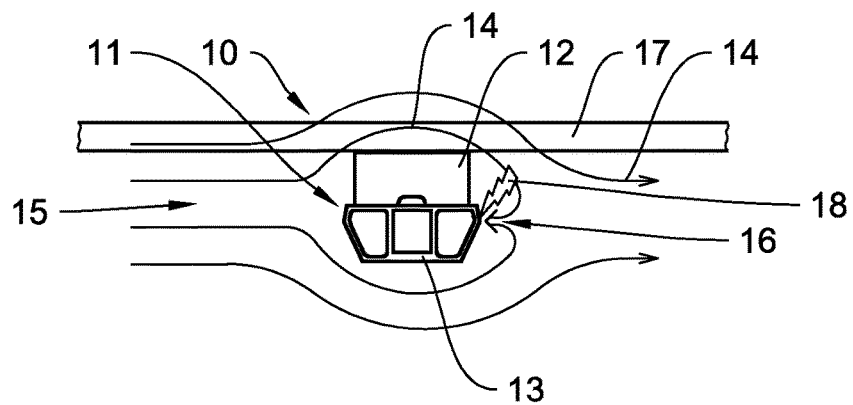
Fig. 1    State of the art
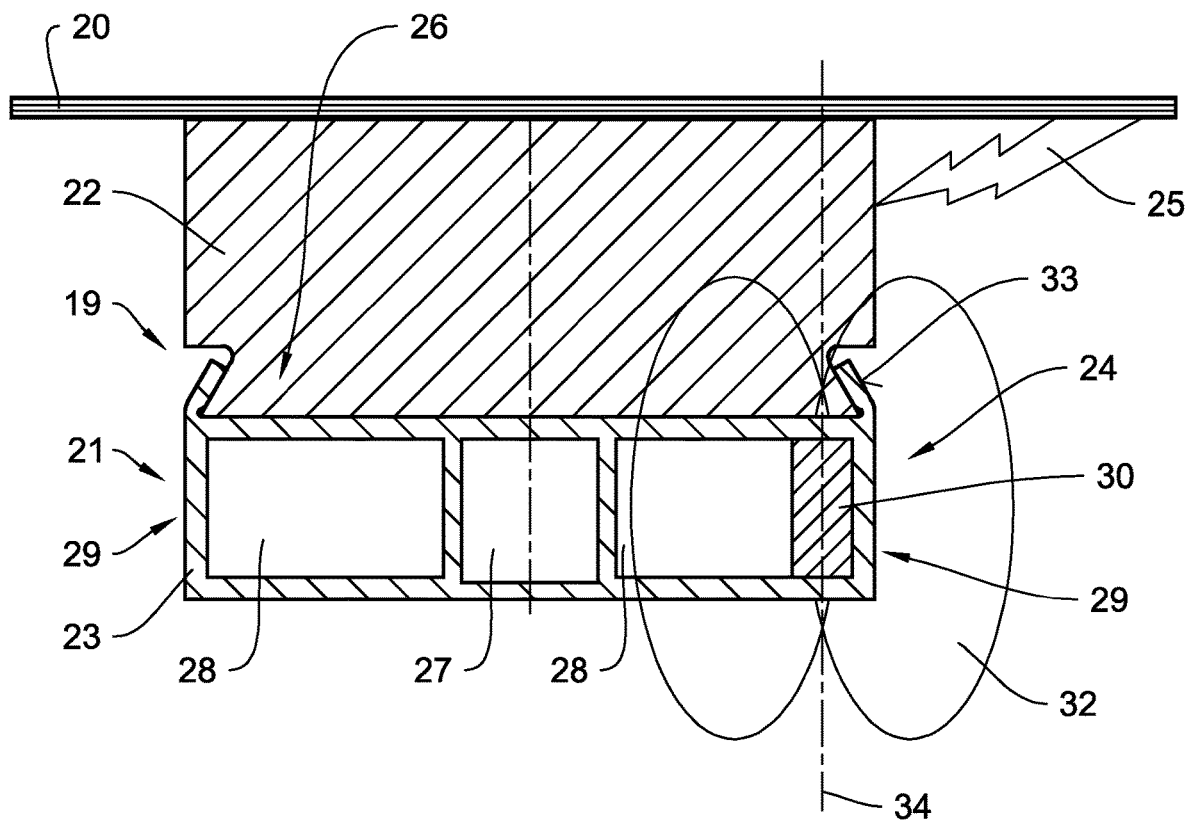
Fig. 2

CONTACT UNIT FOR SUPPLYING VEHICLES WITH POWER AND RELATED METHOD

This application incorporates by reference the disclosure of German Patent Application no. 10 2017 223 401.6, filed Dec. 20, 2017.

FIELD OF THE INVENTION

The invention relates to a contact unit, in particular for supplying vehicles with power via an overhead wire, and to a method for steering electric arcs on a contact unit, the contact unit comprising a sliding contact device which has a contact strip support and a contact strip disposed thereon. Furthermore, the invention relates to a use of a magnet for steering or extinguishing electric arcs on a contact unit.

BACKGROUND OF THE INVENTION

Contact units that have sliding contact devices comprising a contact strip and a contact strip support are used to supply rail-bound vehicles and also vehicles not rail-bound, but driven by electric motors, with power. Said sliding contact devices are pressed against a traction current line or overhead wire by means of a pressure device or a positioning device of the contact unit, such as a pantograph or a linkage, contact pressure force being generated. In this way, a sliding contact is formed, which allows the vehicle to be supplied with power during travel or during a stop of the vehicle.

The substantial aspect is that the sliding contact between the contact strip and the overhead wire is securely maintained as continuously as possible even during dynamic driving of vehicles of this kind. However, uninterrupted contact between the contact strip and the overhead wire cannot always be ensured. In particular when hoarfrost, ice or other adhesions form on the overhead wire, brief separation between the contact strip and the overhead wire cannot be avoided. Because of these instances of separation, among other things, electrical flashover or formation of an electric arc between the overhead wire and the contact strip support or even the positioning device can observed periodically, which can result in damage to the sliding contact device or to components of the positioning device. Electric arcs can even form as soon as the contact strip merely comes into contact with the overhead wire. Increased humidity in the area between the sliding contact device and the overhead wire also contributes to the formation of electric arcs. Especially the contact strip support, which is typically made of metal, can be severely damaged by electric arcs, which makes shortened inspection and replacement intervals necessary.

The contact strip support is commonly formed by an aluminum profile having a U-shaped seat for the contact strip made of a carbon material impregnated with metal, of hard coal, of graphite or of a metal alloy. The contact strip can be glued to the aluminum profile or be clamped to the U-shaped seat in a form-fitting manner by bending or flanging of legs of the U-shaped seat. The contact strip support can also be a so-called auxiliary support, which is installed on a rocker of a pantograph or a linkage. When an electric arc forms between the overhead wire and the contact strip support, heat is introduced into the contact strip support and into the contact strip, which may cause the material of the contact strip support to melt, evaporate or come off. Hence, if electric arcs are formed repeatedly, the contact strip support might be consumed in places, causing it to be weakened or even destroyed.

EP 2 746 091 B1 discloses a sliding contact device which is supposed to prevent formation of electric arcs between a contact strip support and an overhead wire. In particular, a flow channel is formed on the contact strip support, said flow channel allowing targeted steering of an air flow during travel of the vehicle in such a manner that an electric arc is deflected from the contact strip support to the contact strip. Disadvantageously, however, electric arcs will still flash over between the overhead wire and the contact strip support during standstill or even at low speeds of the vehicle for lack of air flow. In this situation, it is no longer possible to reliably prevent such a flashover by means of an established air flow. Moreover, it is desirable for the positioning device of a contact unit to be protected from electric arc flashover as well.

SUMMARY OF THE INVENTION

Hence, the object of the present invention is to propose a contact unit and a method for discharging electric arcs by means of which damage to the contact unit from electric arcs can be prevented better.

The contact unit according to the invention, in particular for supplying vehicles with power via an overhead wire, comprises a sliding contact device, the sliding contact device having a contact strip support and a contact strip disposed thereon, the contact unit having a steering device for electric arcs which is disposed on the contact unit or adjacent to the contact unit, the steering device being provided with a magnet.

A contact unit of this kind can be composed of a contact strip made of a carbon material, graphite, or a metal alloy and disposed on a pantograph or a linkage. The steering device allows electric arcs flashing over between the contact unit and the overhead wire to be specifically steered in such a manner that electric arcs are introduced into the contact strip and are kept away from the contact strip support. An electric arc striking the contact strip will merely heat the contact strip, but nut a support profile, of the contact strip support, supporting the contact strip and typically made of metal. Thus, destruction or melting of said metal due to heat introduction by an electric arc strike can be prevented. Furthermore, an electric arc can even be extinguished so that the electric arc does not jump from the overhead wire to the sliding contact device in the first place. The magnet can be designed or disposed on the contact strip support in any given way, the only substantial aspect being that the design and disposition of the magnet prevent an electric arc from flashing over into a support profile and redirect the electric arc into the contact strip. Therefore, the steering device for electric arcs provides substantially wear-free protection against electric arcs. In this way, excess heat introduction or consumption of a material of the support profile by electric arcs can be effectively prevented during standstill or travel of the vehicle and even in case of mere contact between an overhead wire and the sliding contact device, whereby a service life of the sliding contact device and of a positioning device are prolonged.

It is particularly advantageous for an electric arc to be deflected or extinguished by means of a magnetic field of the magnet. The magnet can be configured and disposed in such a manner that a magnetic field of the magnet forms or is disposed in particular in the area of a support profile of the contact strip support. As was found, a magnetic field can deflect or extinguish an electric arc, preventing the electric arc from striking the support profile.

The steering device can be provided with a plurality of magnets. This allows a support profile of the contact strip support to be protected against electric arc strikes along a length within which an overhead wire is typically moved perpendicular to the contact strip.

Hence, it may be envisaged for the magnets to be disposed at regular intervals along a length of the contact strip support. The substantial aspect is that the magnetic fields of the magnets are configured in such a manner that gaps between the magnets are bridged by the magnetic fields. For example, the magnetic fields of neighboring magnets can overlap each other. In this way, electric arcs can be prevented from striking the support profile between two magnets.

The magnet can be a permanent magnet or an electromagnet. With a permanent magnet, electric arcs can be deflected or extinguished continually. Using an electromagnet, a magnetic field can be established as needed, such as when certain weather conditions make electric arc strikes likely. The electromagnet can be easily supplied with current because current is available via the overhead wire in the case of electrically driven vehicles.

In another particularly simple embodiment, the magnet can be a rod magnet. The rod magnet can be disposed along a length of the contact strip support. Rod magnets are easily and cost-effectively available in large quantities.

The magnet can be disposed on a support profile of the contact strip support, wherein an electric arc can be deflected from the support profile and be steered toward the contact strip or be extinguished by means of the magnet. The magnet is configured in the manner of a deflecting magnet which can prevent an electric arc from striking the support profile. A magnetic field of the magnet does not even have to be particularly strong. In fact, even magnetic fields of low strength exert a deflecting force on electric arcs. The support profile can be made of aluminum or another suitable metal, for example. It is particularly advantageous if the support profile itself is not magnetic or cannot be magnetized.

The magnet can be disposed within and/or on the outside of the support profile. By being disposed within the support profile, the magnet is protected against environmental influences. Also, an outer contour of the support profile remains unchanged, meaning that aerodynamic properties of the sliding contact device do not change, either. However, it is also possible to dispose the magnet on an external surface of the support profile or to attach it thereto. In principle, this also allows retrofitting of a sliding contact device according to the state of the art with a magnet.

The magnet can be disposed on a longitudinal side of the support profile that is turned away from the direction of travel and/or on a longitudinal side of the support profile that is turned toward the direction of travel. Since an air flow formed on the sliding contact device during travel of the vehicle will also influence flashover of an electric arc and its path, the magnet can at least be disposed on the longitudinal side turned away from the direction of travel. If a magnet is disposed on each of the opposing sides, it can be additionally ensured that electric arcs are prevented from striking the support profile in any case when contact is made with an overhead wire during standstill of the vehicle. For example, a row of magnets can be disposed within or outside of the support profile on each longitudinal side. Depending on the nature and strength of the magnetic field, another magnet or a plurality of magnets can be disposed at the center within the support profile. The substantial aspect is that an outer contour of the support profile is still covered by a sufficiently strong magnetic field at all times.

A symmetry axis of a magnetic field of the magnet can run through the longitudinal side or through the contact strip. This means that it is possible in principle for the magnetic field of a rod-shaped magnet to be disposed in the direction of the contact strip or perpendicular thereto. Likewise, it is possible to dispose the magnet substantially parallel to an overhead wire, which means that the symmetry axis of the magnetic field will run through the longitudinal side.

The steering device can have a holding profile which extends along a support profile of the contact strip support and on or to which a magnet can be disposed or attached, wherein the holding profile can be removably attached to the support profile, wherein an electric arc can be de-fleeted from the support profile and be steered toward the contact strip or be extinguished by means of the magnet. In this embodiment of a steering device, the magnet does not have to be attached directly to the support profile. For example, the holding profile can be installed together with the magnet and then be attached to the support profile, for example. This significantly simplifies retrofitting of existing sliding contact devices from the state of the art with a steering device.

It is particularly advantageous if the magnet is disposed adjacent to an upper edge of the support profile. The magnet is located at an outer border between the support profile and the contact strip at a relatively short distance from an overhead wire, which means that an electric arc would have to penetrate the magnetic field of the magnet first in order to make contact with the support profile. Deflecting of the electric arc into the contact strip is made easier with the magnet disposed at the upper edge of the support profile.

Alternatively, the steering device can have a holding profile which can extend parallel to a support profile of the contact strip support and on which the magnet is disposed, wherein the holding profile can be disposed on the contact strip support at a distance relative to the support profile, wherein an electric arc can be deflected from the support profile and be steered toward the contact strip or be extinguished by means of the magnet. A magnetic field of the magnet can be influenced in particular if the support profile and other components of the contact strip support are made of materials that can be magnetized. Hence, it is advantageous if the magnet is disposed adjacent to the support profile at a suitable distance from said components. The holding profile can then also be broad enough to protrude beyond a cross-section of the support profile at the sides.

Furthermore, the contact unit can comprise a positioning device for holding and positioning the sliding contact device against an overhead wire, wherein the positioning device can have the steering device, wherein the magnet can be disposed on a portion of the positioning device, wherein said portion is the part of the positioning device that is closest to the overhead wire relative to the overhead wire when the positioning device is in a contact position in which the contact strip is in contact with the overhead wire, wherein an electric arc can be deflected from said portion and be steered toward the contact strip or be extinguished by means of the magnet. Accordingly, the steering device can also be disposed on the positioning device and prevent an electric arc from flashing over and striking the positioning device. The positioning device can be a pantograph, a linkage, or the like. An electric arc striking the positioning device can cause particularly heavy damage to the positioning device. Especially the sections of the positioning device that closely approach an overhead wire, such as a top tube, are at particular risk.

In order to make the contact unit even safer, the sliding contact device and the positioning device can each have a steering device.

In the method according to the invention for steering electric arcs on a contact unit, in particular for supplying vehicles with power via an overhead wire, a contact strip support having a contact strip of a sliding contact device of the contact unit disposed therein is brought into contact with an overhead wire by means of a positioning device of the contact unit, an electric arc being formed between the overhead wire and the contact strip, the electric arc being extinguished or steered toward the contact strip, making contact with the contact strip, by means of a steering device of the contact unit provided with a magnet. Extinction of the electric arc means that the electric arc does not occur in the first place or is attenuated at least to some extent during flashover. The positioning device serves to hold and position the sliding contact device, meaning that the positioning device can be used to move the contact strip toward the overhead wire and to establish contact between the contact strip and the overhead wire. The electric arc between the contact strip and the overhead wire can form prior to or during said contact. The vehicle can be moving or can be standing still on a driving route. The substantial aspect is that an electric arc is formed solely between the overhead wire and the contact strip if an electric arc occurs. The steering device or the magnet forming the steering device ensures that the electric arc does not reach any other components of the sliding contact device or of the positioning device, i.e. does not strike them. With regard to other advantages of the method according to the invention, reference is made to the description of advantages of the contact unit according to the invention.

Other advantageous embodiments of the method are apparent from the description of features of the claims dependent on device claim 1.

Regarding the use of a magnet according to the invention for steering or extinguishing electric arcs on a contact unit, in particular for supplying vehicles with power via an overhead wire, the contact unit comprises a sliding contact device having a contact strip support and a contact strip disposed thereon and a positioning device for holding and positioning the sliding contact device, the magnet forming a steering device for electric arcs and being disposed on the contact unit. With regard to the advantages of the use of a magnet as per the invention, reference is made to the description of advantages of the device according to the invention and of the method according to the invention.

Other variations of a use are apparent from the description of features of the claims dependent on device claim 1.

BRIEF DESCRIPTION OF THE DRAWING FIGURE

Hereinafter, the invention will be discussed in more detail with reference to the accompanying drawing.

FIG. 1 is a cross-section view showing a sliding contact device according to the state of the art;

FIG. 2 is a cross-section view showing a first embodiment of a sliding contact device;

DETAILED DESCRIPTION OF THE INVENTION

Figure 3:
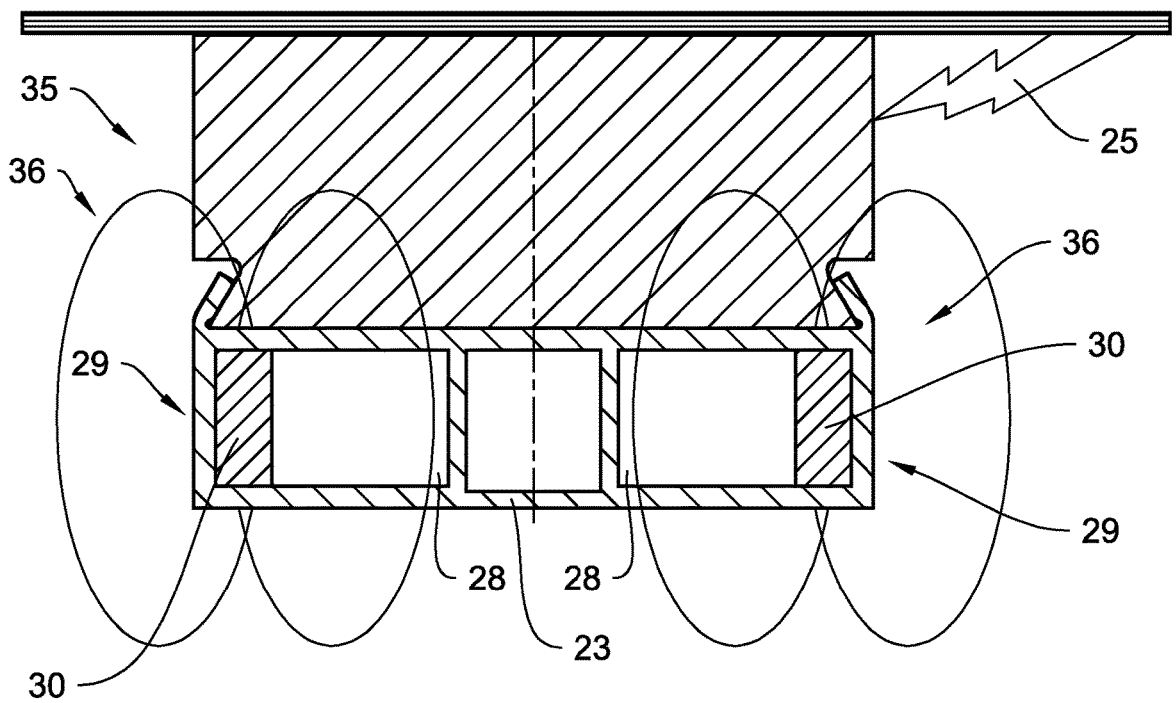
FIG. 3 is a cross-section view showing a second embodiment of a sliding contact device.

FIG. 1 shows a cross-section view of a sliding contact device 10 of a contact unit (not shown) according to the state of the art, comprising a contact strip support 11 and a contact strip 12 which are disposed on and attached to a support profile 13 of the contact strip support 11. As indicated by line 14, an air flow 15 which swirls at a longitudinal side 16 of the sliding contact device 10 flows around the sliding contact device 10 during travel of a vehicle (not shown). An electric arc 18 occurs between an overhead wire 17, which runs perpendicular to and is in contact with the sliding contact device 10, and the support profile 13. The electric arc 18 on the support profile 13 causes a material of the support profile 13 to come off and to heat in places.

FIG. 2 shows an embodiment of a sliding contact device 19 which is disposed on a positioning device (not shown) for positioning the sliding contact device 19 against an overhead wire 20 and which forms a contact unit with the positioning device. The sliding contact device 19 comprises a contact strip support 21 and a contact strip 22 disposed thereon. The contact strip support 21 is formed by a support profile 23 and comprises a steering device 24 for deflecting or extinguishing electric arcs 25. The contact strip 22 is made of graphite and is inserted into a trapezoidal groove 26 of the aluminum support profile 23. The contact strip 22 can also be connected to the support profile 23 by means of an adhesive material (not shown) in the groove 26, for example. The support profile 23 has a central hollow chamber 27 and two outer hollow chambers 28. The outer hollow chambers 28 are adjacent to longitudinal sides 29 of the support profile 23. In one hollow chamber 28, a magnet 30 is inserted at the longitudinal side 29, the magnet forming the steering device 24 for the electric arc 25. In particular, a magnetic field 32 of the magnet is configured in such a manner that a contour 33 of the longitudinal side 29 is substantially located within the magnetic field 32. The magnetic field 32 prevents the electric arc 25 from striking the support profile 23 by deflecting the electric arc 25 toward the contact strip 22. A symmetry axis 34 of the magnetic field 32 runs through the contact strip 22.

FIG. 3 shows an embodiment of a sliding contact device 35 which differs from the sliding contact device of FIG. 2 by having a steering device 36 with two magnets 30, each of which is disposed in one of the outer hollow chambers 28 at the longitudinal sides 29. Said steering device 36 thus allows deflection of electric arcs 25 on both longitudinal sides 29 of the support profile 23.

Figure 4:
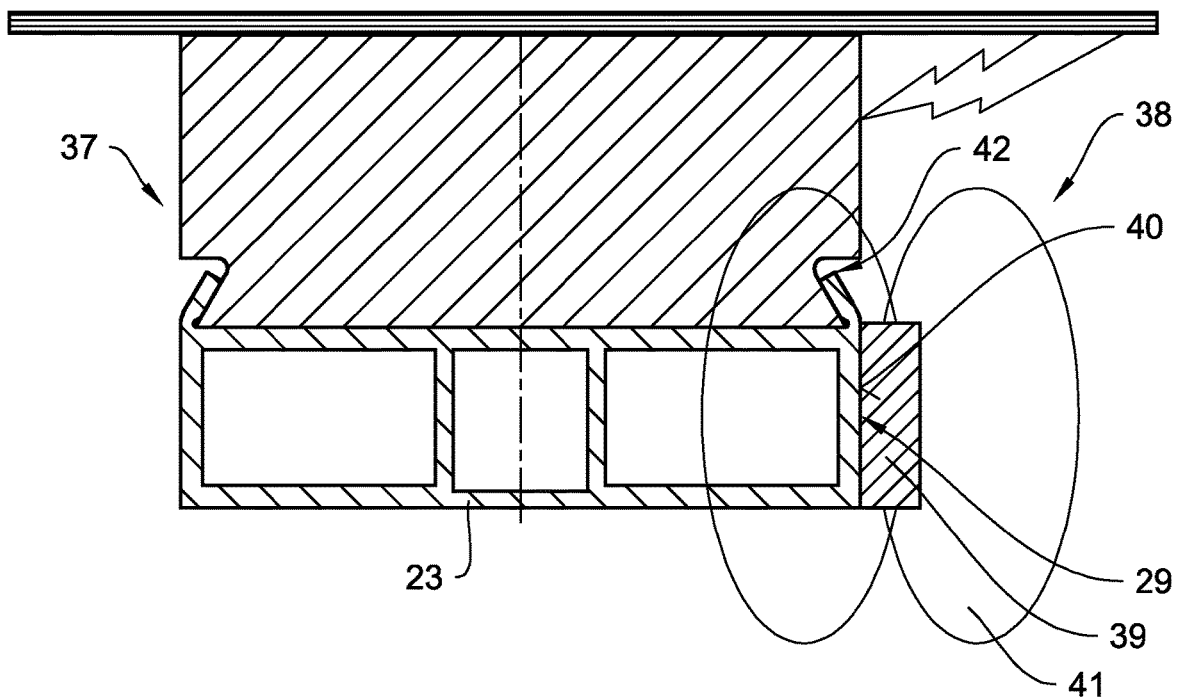
FIG. 4 is a cross-section view showing a third embodiment of a sliding contact device.

FIG. 4 shows an embodiment of a sliding contact device 37 which differs from the sliding contact device of FIG. 2 by having a steering device 38 whose magnet 39 is disposed on an external surface 40 of the support profile 23 on the longitudinal side 29. A magnetic field 41 of the magnet 39 can be shifted closer to an upper edge 42 of the support profile 23.

Figure 5:
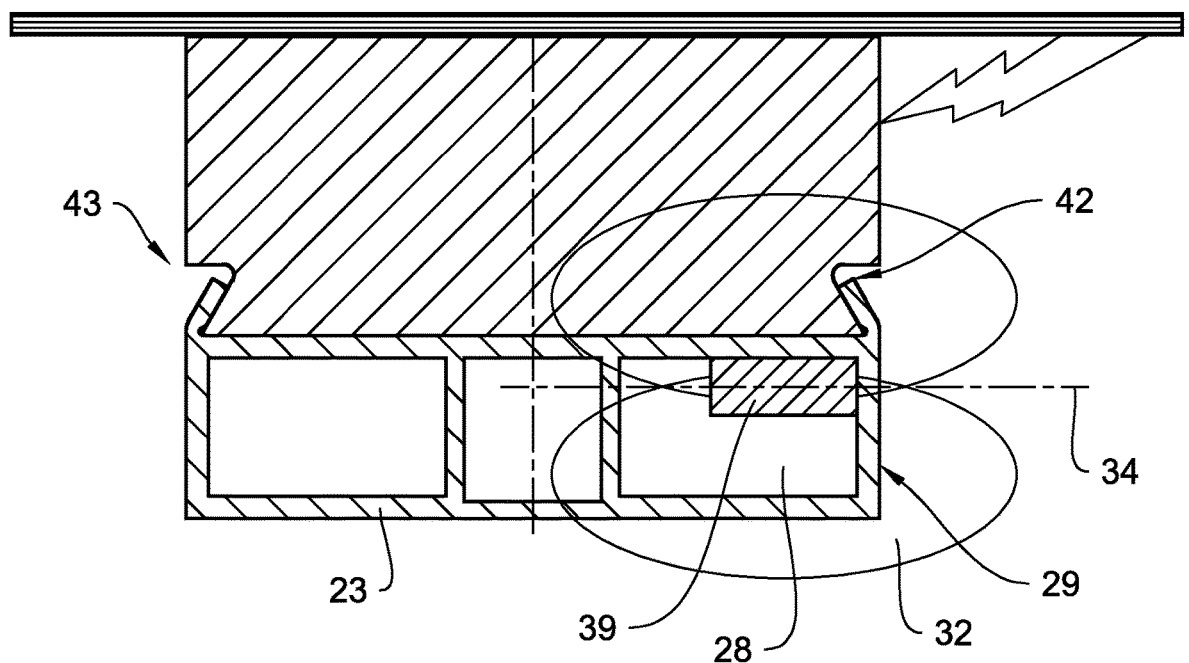
FIG. 5 is a cross-section view showing a fourth embodiment of a sliding contact device.

FIG. 5 shows an embodiment of a sliding contact device 43 which differs from the sliding contact device of FIG. 2 in that the symmetry axis 34 of the magnetic field 32 of the magnet 39 is disposed in the hollow chamber 28 in such a manner that the symmetry axis runs through the longitudinal side 29. Also, the magnetic field 32 covers the upper edge 42 of the support profile 23.

Figure 6:
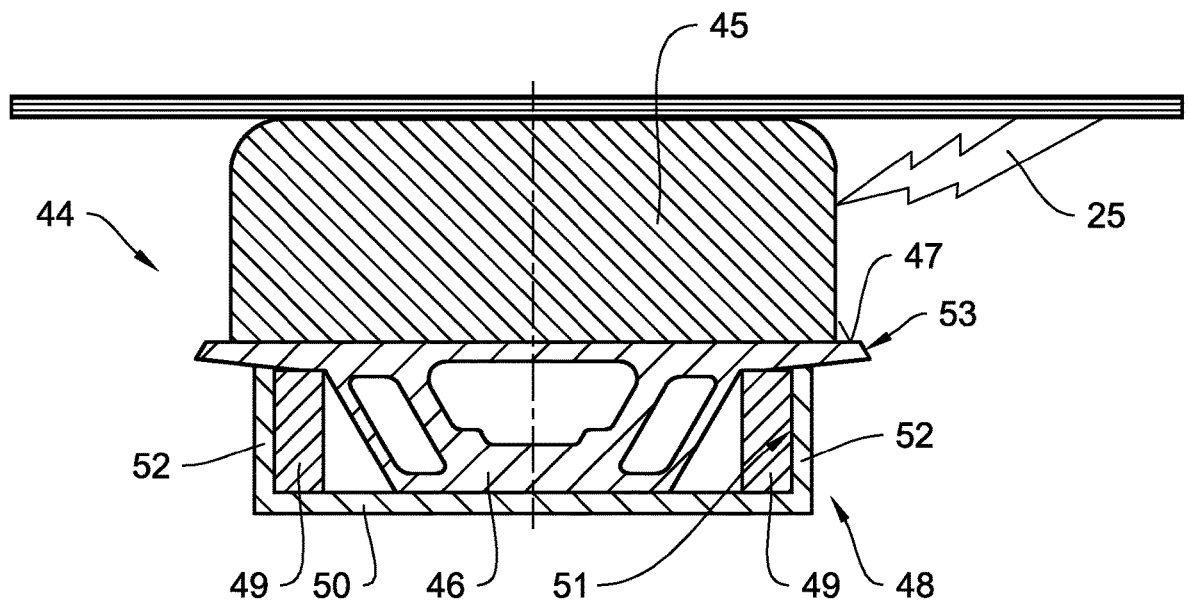
FIG. 6 is a cross-section view showing a fifth embodiment of a sliding contact device.

FIG. 6 shows an embodiment of a sliding contact device 44 having a contact strip 45 which is attached to a support profile 46 or to its surface 47 by means of an adhesive material (not shown). The sliding contact device 44 comprises a steering device 48 having two magnets 49, the magnets 49 being attached to a holding profile 50 of the steering device 48. The holding profile 50 is U-shaped and the magnets 49 are attached to an inside 51 of legs 52 of the U-shaped holding profile 50. The holding profile 50 itself is permanently connected to the support profile 46 by means of a screw connection (not shown). With the aid of the holding profile 50, the magnets 49 can be positioned close enough to an outer edge 53 of the support profile 46 for an electric arc 25 to be largely prevented from striking in the area of the outer edge 53.

Figure 7:
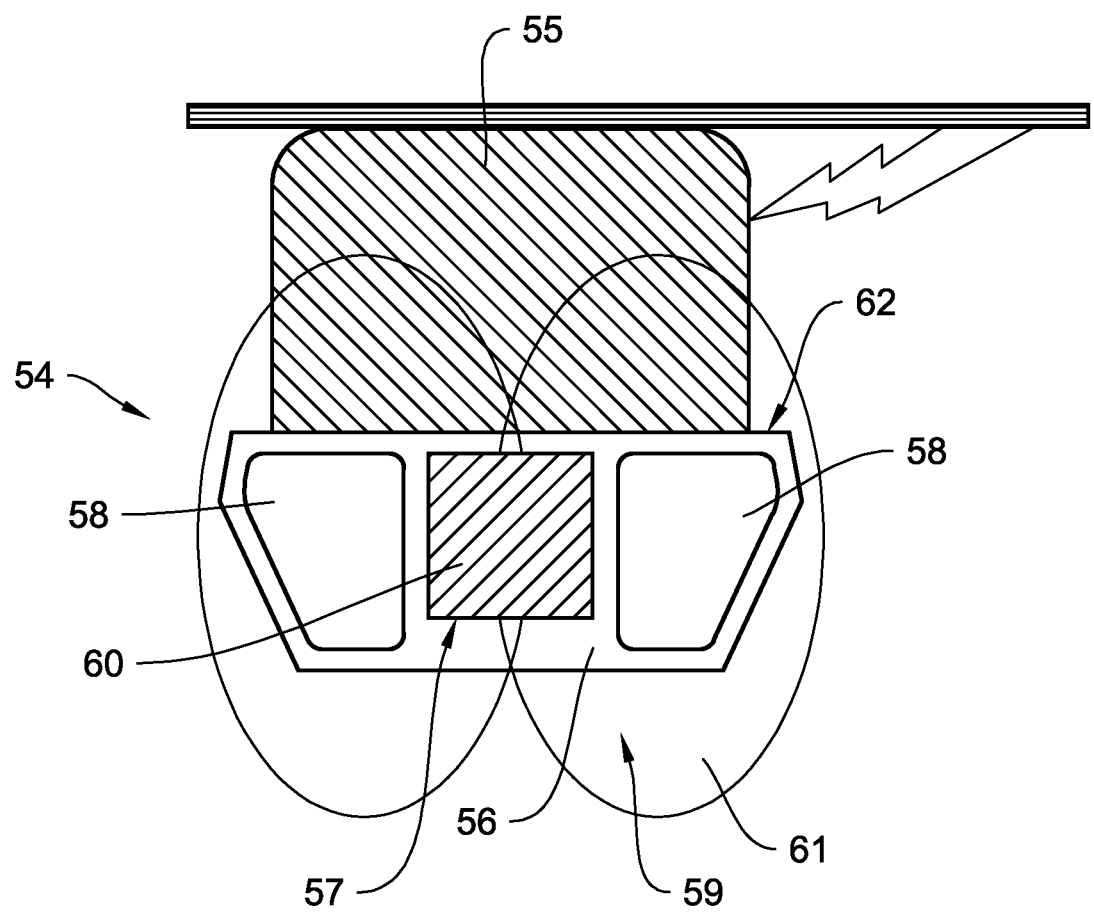
FIG. 7 is a cross-section view showing a sixth embodiment of a sliding contact device.

FIG. 7 shows an embodiment of a sliding contact device 54 which comprises a contact strip 55 and a support profile 56. The support profile 56 has a central hollow chamber 57 and two outer hollow chambers 58. A steering device 59 of the sliding contact device 54 is formed by a magnet 60 which is inserted into the central hollow chamber 57.

The dimensions of the magnet 60 are relatively large, allowing a magnetic field 61 of the magnet 60 to cover upper edges 62 of the support profile 56 at both sides.

The invention claimed is:

1. A contact unit, in particular for supplying vehicles with power via an overhead wire (20), the contact unit comprising a siding contact device (19, 35, 37, 43, 44, 54), the sliding contact de-vice having a contact strip support (21) and a contact strip (22, 45, 55) disposed thereon,
characterized in that
the contact unit has a steering device (24, 36, 38, 48, 59) for electric arcs (25) which is disposed on the contact unit, the steering device being provided with a magnet (30, 39, 49, 60); and
the magnet (30, 39, 49, 60) is disposed on a support profile (23, 46, 56) of the contact strip support (21), wherein an electric arc (25) from the overhead wire can be deflected from the support profile and be steered toward the contact strip (22, 45, 55) or be extinguished.

2. The contact unit according to claim 1,
characterized in that
an electric arc (25) is deflected or extinguished by means of a magnetic field (32, 41, 61) of the magnet (30, 39, 49, 60).

3. The contact unit according to claim 1,
characterized in that
the magnet (30, 39, 49, 60) is a permanent magnet or an electromagnet.

4. The contact unit according to claim 1,
characterized in that
the magnet (30, 39, 49, 60) is a rod magnet.

5. The contact unit according to claim 1,
characterized in that the magnet (30, 39, 49, 60) is disposed within and/or on the outside of the support profile (23, 46, 56).

6. The contact unit according to claim 1,
characterized in that
the magnet (30, 39, 49, 60) is disposed on a longitudinal side (29) of the support profile (23, 46, 56) turned away from the direction of travel and/or on a longitudinal side of the support profile (23, 46, 56) turned toward the direction of travel.

7. The contact unit according to claim 1,
characterized in that
a symmetry axis (34) of a magnetic field (32, 41, 61) of the magnet (30, 39, 49, 60) runs through the longitudinal side (29) or through the contact strip (22, 45, 55).

8. The contact unit according to claim 1,
characterized in that
the steering device (48) has a holding profile (50) which extends along a support profiles (46) of the contact strip support and on which the magnet (49) is disposed, the holding profile being removable attached to the support profile, wherein an electric arc (25) can be deflected from the support profile and from the holding profile and be steered toward the contact strip (45) or be extinguished by means of the magnet.

9. The contact unit according to claim 1,
characterized in that
the magnet (30, 39, 49, 60) is disposed adjacent to an upper edge (42, 62) of the support profile (23, 46, 56).

10. The contact unit according to claim 1,
characterized in that
the contact unit comprises a positioning device for holding and positioning the sliding contact device (19, 35, 37, 43, 44, 54) against an overhead wire (20), the positioning device having the steering device (24, 36, 38, 48, 59), the magnet (30, 39, 49, 60) being disposed on a portion of the positioning device, wherein when the positioning device is in a contact position in which the contact strip is in contact with the overhead wire (20), said portion is the part of the positioning device that is closest to the overhead wire relative to the overhead wire, wherein an electric arc (25) can be deflected from said portion and be steered toward the contact strip or be extinguished by means of the magnet.

11. The contact unit according to claim 1,
characterized in that
the steering device (24, 36, 38, 48, 59) is provided with a plurality of magnets (30, 39, 49, 60).

12. The contact unit according to claim 11,
characterized in that
the magnets (30, 39, 49, 60) are disposed at regular intervals along a length of the contact strip support (21).

13. The contact unit according to claim 1,
characterized in that
the steering device has a holding profile which extends parallel to a support profile (23, 46, 56) of the contact strip support (21) and on which the magnet (30, 39, 49, 60) is disposed, the holding profile being disposed on the contact strip support at a distance relative to the support profile, wherein an electric arc (25) can be deflected from the support profile and be steered toward the contact strip (22, 45, 55) or be extinguished by means of the magnet.

14. The contact unit according to claim 13,
characterized in that
the sliding contact device (19, 35, 37, 43, 44, 54) and the positioning device each have a steering device (24, 36, 38, 48, 59).

15. A method for steering electric arcs (25) on a contact unit, in particular for supplying vehicles with power via an overhead wire (20), a contact strip support (21) having a contact strip (22, 45, 55) of a sliding contact device (19, 35, 37, 43, 44, 54) of the contact unit disposed thereon is brought into contact with an overhead wire by means of a positioning device of the con-tact unit, an electric arc being formed between the overhead wire and the contact strip, characterized in that by means of a steering device (24, 36, 38, 48, 59) of the contact unit which is provided with a magnet (30, 39, 49, 60), the electric arc is extinguished or is steered toward the contact strip and makes contact with the contact strip; and the magnet (30, 39, 49, 60) is disposed on a support profile (23, 46, 56) of the contact strip support (21), wherein the electric arc (25) from the overhead wire can be deflected from the support profile and be steered toward the contact strip (22, 45, 55) or be extinguished.

16. A use of a magnet (30, 39, 49, 60) for steering or extinguishing electric arcs (25) on a contact unit, in particular for supplying vehicles with power via an overhead wire (20), the contact unit comprising a sliding contact device (19, 35, 37, 43, 44, 54) which has a contact strip support (21) and a contact strip (22, 45, 55) disposed thereon and a positioning device for holding and positioning the sliding contact device, the magnet forming a steering device (24, 36, 38, 48, 59) for electric arcs and being disposed on a support profile of contact strip support of the contact unit;

wherein the electric arcs (25) from the overhead wire can be deflected from the support profile and be steered toward the contact strip (22, 45, 55) or be extinguished.

\* \* \* \* \*